US011323260B2

(12) United States Patent
Wang et al.

(10) Patent No.: US 11,323,260 B2
(45) Date of Patent: May 3, 2022

(54) METHOD AND DEVICE FOR IDENTITY VERIFICATION

(71) Applicant: Advanced New Technologies Co., Ltd., Grand Cayman (KY)

(72) Inventors: Zhiwei Wang, Hanzhou (CN); Wenbo Yang, Hangzhou (CN)

(73) Assignee: Advanced New Technologies Co., Ltd., George Town (KY)

(*) Notice: Subject to any disclaimer, the term of this patent is extended or adjusted under 35 U.S.C. 154(b) by 0 days.

(21) Appl. No.: 17/163,122

(22) Filed: Jan. 29, 2021

(65) Prior Publication Data
US 2021/0152357 A1    May 20, 2021

Related U.S. Application Data

(63) Continuation of application No. PCT/CN2019/123309, filed on Dec. 5, 2019.

(30) Foreign Application Priority Data

Dec. 25, 2018   (CN) .......................... 201811591932.2

(51) Int. Cl.
  *H04L 9/32* (2006.01)
  *H04L 9/08* (2006.01)
(52) U.S. Cl.
  CPC ............ *H04L 9/321* (2013.01); *H04L 9/0894* (2013.01); *H04L 9/3236* (2013.01); *H04L 2209/38* (2013.01)

(58) Field of Classification Search
  CPC ..... H04L 9/321; H04L 9/0894; H04L 9/3236; H04L 2209/38; G06F 21/31; G06F 21/64
  (Continued)

(56) References Cited

U.S. PATENT DOCUMENTS 10,135,834 B1 *  11/2018  Galebach .............. H04L 63/102
10,581,615 B2 *  3/2020   Xie ........................ H04L 9/0637
(Continued)

OTHER PUBLICATIONS

Boixo, S. et al. "Simulation of low-depth quantum circuits as complex undirected graphical models". Jan. 2018 , [online], [retrieved on Aug. 28, 2019]. https://arxiv.org/pdf/1712.05384.pdf.

*Primary Examiner* — Dant B Shaifer Harriman
(74) *Attorney, Agent, or Firm* — Shun Yao; Yao Legal Service, Inc.

(57) ABSTRACT

One embodiment provides a method and system for identity verification. During operation, a digital identity client executing on a computer receives an identity-verification request comprising an identifier of a user, sends a query for available identity-verification services to identity-verification-service-publishing blockchain, determines an identity-verification server based on a result of the query, interacts with the determined identity-verification server to complete identity verification of the user, generates a public-private key pair comprising a public key and a private key corresponding to the identifier of the user, and stores, in identity-verification blockchain, identity-verification information associated with the user. The identity-verification information comprises at least a hash value of the public key, thereby facilitating subsequent identity verification of the user based on the identity-verification information stored in the identity-verification blockchain.

18 Claims, 8 Drawing Sheets

(58) Field of Classification Search
USPC .......................................................... 713/182
See application file for complete search history.

(56) References Cited

U.S. PATENT DOCUMENTS

| | | | |
|---|---|---|---|
| 10,715,311 B2* | 7/2020 | Sundaresan | H04L 9/14 |
| 10,915,891 B1 | 2/2021 | Winklevoss | |
| 2004/0024750 A1 | 2/2004 | Ulyanov | |
| 2014/0245004 A1* | 8/2014 | Houston | H04L 63/0428 |
| | | | 713/168 |
| 2018/0294966 A1* | 10/2018 | Hyun | H04L 9/3226 |
| 2019/0163912 A1* | 5/2019 | Kumar | H04L 63/0823 |
| 2019/0325473 A1 | 10/2019 | Swamidurai | |
| 2019/0385215 A1 | 12/2019 | Ferenczi | |
| 2020/0128022 A1 | 4/2020 | Bleikertz | |
| 2020/0193432 A1 | 6/2020 | Millar | |
| 2021/0012332 A1* | 1/2021 | Ow | H04L 9/3239 |
| 2021/0224249 A1* | 7/2021 | Jing | G06F 16/2365 |

* cited by examiner

METHOD AND DEVICE FOR IDENTITY VERIFICATION

RELATED APPLICATION

Under 35 U.S.C. § 120 and § 365(c), this application is a continuation of PCT Application No. PCT/CN2019/123309, entitled "METHOD AND DEVICE FOR IDENTITY VERIFICATION," by inventors Zhiwei Wang and Wenbo Yang, filed 5 Dec. 2019, which claims priority to Chinese Patent Application No. 201811591932.2, filed on 25 Dec. 2018.

TECHNICAL FIELD

The present application relates to the field of computer technologies, and in particular to blockchain-based identity verification technology.

BACKGROUND

With the increasingly frequent movement of people among countries around the world, many problems will arise when identity authentication has to be performed on people who want to enjoy certain services in non-domiciled countries. A serious problem is that many countries have strict control on data leaving the countries. Some data (such as fingerprints, facial data, and the like) required for identity authentication is not allowed to leave the countries. How to perform transnational and transregional identity verification under the condition that data leaving countries is controlled has become an urgent problem to be solved by many transnational services.

SUMMARY

The objective of the present application is to provide a method and a system for identity verification. Identity verification is performed by using blockchain technology, so that transnational and transregional identity verification can be performed under the condition that data leaving countries is controlled by the respective countries.

In order to solve the aforementioned problem, one embodiment provides a method and system for identity verification. During operation, a digital identity client executing on a computer receives an identity-verification request comprising an identifier of a user, sends a query for available identity-verification services to identity-verification-service-publishing blockchain, determines an identity-verification server based on a result of the query, interacts with the determined identity-verification server to complete identity verification of the user, generates a public-private key pair comprising a public key and a private key corresponding to the identifier of the user, and stores, in identity-verification blockchain, identity-verification information associated with the user. The identity-verification information comprises at least a hash value of the public key, thereby facilitating subsequent identity verification of the user based on the identity-verification information stored in the identity-verification blockchain.

In a variation on this embodiment, the digital identity client receives, from an application requiring identity verification of the user, a first request comprising the identifier of the user and first information; and transmits the public key corresponding to the identifier of the user and signed data to the application. The signed data is generated by signing the first information using the corresponding private key, thereby facilitating the application in performing identity verification of the user.

In a further variation, the application sends a checking request to a first node of the identity-verification blockchain. The checking request comprises the signed data and the public key, thereby facilitating the first node to perform checking based on the signed data and the public key. The application receives a checking result from the first node of the identity-verification blockchain and performs identity verification of the user according to the checking result.

In a further variation, the identity-verification information stored in the identity-verification block chain further comprises: a type of identity verification that successfully validates the user's identity, and a hash value of the identifier of the user; and the checking request further comprises a hash value of the identifier of the user. The first node performs the checking by: computing a hash value of the public key included in the checking request; searching the identity-verification blockchain for an identifier hash value and a type of identity verification that successfully validates the user's identity corresponding to the computed hash value of the public key; performing signature validation on the signed data in the checking request using the public key; and in response to the searched identifier hash value matching the identifier of the user in the checking request and the signature validation being successful, sending to the application the searched type of identity verification that successfully validates the user's identity as the checking result.

In a further variation, in response to determining that the type of identity verification that successfully validates the user's identity in the checking result does not meet a service requirement, the application queries a second node of the identity-verification-service-publishing blockchain for an identity verification service meeting the service requirement, sends a second identification-verification request, by the application to the digital identity client, which forwards the second identification-verification request to a server associated with the identity verification service meeting the service requirement, the second identification-verification request comprising the signed data and the public key. The server associated with the identity verification service meeting the service requirement performs identity validation of the user and updates the identity-verification information stored in the identity-verification blockchain.

In a further variation, the identity-verification-service-publishing blockchain comprises nodes located in different countries or regions, and the second node of the identity-verification-service-publishing blockchain an object requiring identity verification belong to the same country or region.

In a further variation, updating the identity-verification information stored in the identity-verification blockchain further comprises: sending, by the server associated with the identity verification service meeting the service requirement, to a third node of the identity-verification blockchain the signed data and the public key; performing, by the third node, signature checking on the signed data based on the public key; and in response to the signature checking being successful, updating the identity-verification information corresponding to the public key.

In a further variation, the identity-verification blockchain comprises nodes located in different countries or regions, and the first node and the application belong to a same country or region.

In a further variation, the first information comprises one or more of: a service identifier and a random number.

In a variation on this embodiment, the determined identity-verification server is located in a domiciled country or region associated with the user.

In a variation on this embodiment, an identity-verification server sends, to a fourth node of the identity-verification-service-publishing blockchain, information associated with the available identity-verification services. The fourth node and the identity-verification server belong to the same country or region. The fourth nodes stores information about the available identity-verification services in the identity-verification-service-publishing blockchain, publishes the information to other nodes of the identity-verification-service-publishing blockchain.

In order to solve the aforementioned problem, the present application discloses an identity verification method, comprising:

sending, by an application requiring an identity verification service, a first request to a digital identity client, the first request comprising an identifier and first information;

receiving, by the application, signature information and a public key corresponding to the identifier returned by the digital identity client, wherein the signature information is acquired by digitally signing the first information using a private key corresponding to the public key by the digital identity client;

sending, by the application, a second request to a first node of first blockchain, the second request comprising the signature information and the public key for the first node to perform checking according to the signature information and the public key; and receiving, by the application, a checking result of the checking returned by the first node, and performing identity verification according to the checking result.

In a preferred embodiment, the first node and the application belong to the same country or region.

In a preferred embodiment, the digital identity client runs in a user terminal; the digital identity client and an identity verification object belong to the same country or region.

In a preferred embodiment, the first information comprises a service identifier.

In a preferred embodiment, the first information further comprises a random number.

In a preferred embodiment, after the application sends the first request to the digital identity client, the method further comprises:

performing, by the digital identity client, account-level validation according to the identifier;

after the account-level validation succeeds, acquiring, by the digital identity client, the public key and the private key corresponding to the identifier, and digitally signing the first information using the private key to acquire the signature information; and sending, by the digital identity client, the public key and the signature information to the application.

In a preferred embodiment, after the application sends the second request to the first node of the first blockchain, the method further comprises:

performing, by the first node, the checking according to the signature information and the public key.

In a preferred embodiment, the second request further comprises a hash value of the identifier;

the first node performing the checking according to the signature information and the public key further comprises:

the first node computing a public key address according to the public key, and searching the first blockchain for an identifier hash value and a successfully validated identity verification type corresponding to the public key address; and performing, by the first node, signature validation on the signature information using the public key, and sending to the application the successfully validated identity verification type as the checking result if the signature validation succeeds and the identifier hash value found on the first blockchain is identical to the identifier hash value in the second request.

In a preferred embodiment, after the application receives the checking result of the checking returned by the first node, the method further comprises:

determining, by the application, whether the successfully validated identity verification type in the checking result meets a service requirement; if not, querying, a second node of second blockchain used to publish an identity verification service, for an available identity verification service; selecting, from a query result, an identity verification service meeting the service requirement; and sending a third request to the digital identity client, the third request comprising a type of the selected identity verification service;

sending, by the digital identity client, a fourth request to a corresponding identity verification server according to the type of the identity verification service in the third request, the fourth request comprising the signature information and the public key; and performing, by the identity verification server, identity validation, and updating the first blockchain with a received public key address, the successfully validated identity verification type, and the hash value of the identifier.

In a preferred embodiment, updating the first blockchain with a received public key address, the successfully validated identity verification type, and the hash value of the identifier further comprises:

sending, by the identity verification server, to a node of the first blockchain the received public key, the successfully validated identity verification type, and the signature information; performing, by the node, signature checking according to the received signature information and the public key; and updating the first blockchain with the successfully validated identity verification type corresponding to the public key if the checking succeeds.

In a preferred embodiment, after updating the first blockchain with the received public key address, the successfully validated identity verification type, and the hash value of the identifier, the method further comprises:

sending, by the application, a fifth request to the first node of the first blockchain, the fifth request comprising the signature information and the public key;

performing, by the first node, checking according to the signature information and the public key in the fifth request, and returning a checking result; and receiving, by the application, the checking result returned by the first node and performing identity verification according to the checking result.

In a preferred embodiment, the second node and an object requiring identity verification belong to the same country or region.

In a preferred embodiment, the second blockchain publishes the identity verification service in the following manner:

sending, by the identity verification server, to a third node of the second blockchain information about available identity verification services, wherein the third node and the identity verification server belong to the same country or region; and storing, by the third node, the information about the identity verification services on the second blockchain, and spreading the information to other nodes of the second blockchain comprising the second node.

In a preferred embodiment, before the application requiring the identity verification service sends the first request to the digital identity client, the method further comprises:

receiving, by the digital identity client, the identifier;

querying, by the digital identity client, a second node of second blockchain used to publish identity verification services, for an available identity verification service, completing identity validation according to a query result by means of interaction with an identity verification server, receiving an identity validation result from the identity verification server, generating the paired public key and private key corresponding to the identifier, computing a public key address, and sending the public key address to the identity verification server; and storing, by the identity verification server, the received public key address, the successfully validated identity verification type, and a hash value of the identifier on the first blockchain.

In a preferred embodiment, after the digital identity client receives the identifier, the method further comprises:

performing account-level validation according to the identifier.

The present application further discloses an identity verification system, comprising: an application requiring an identity verification service, a digital identity client, and first blockchain, wherein the application comprises a request sending module and an identity verification module; the request sending module is configured to send a first request to the digital identity client, the first request comprising an identifier and first information, and send a second request to a first node of the first blockchain, the second request comprising signature information and a public key returned by the digital identity client; the identity verification module is configured to perform identity verification according to a checking result returned by the first node;

the digital identity client comprises a signing module and a sending module; the signing module is configured to digitally sign the first information using a private key corresponding to the identifier in the first request to acquire the signature information; the sending module is configured to return to the application the signature information and the public key corresponding to the identifier; and the first node comprises a checking module for performing checking according to the signature information and the public key in the second request, and returning the checking result to the application.

In a preferred embodiment, the first node and the application belong to the same country or region.

In a preferred embodiment, the digital identity client runs in a user terminal; the digital identity client and an identity verification object belong to the same country or region.

In a preferred embodiment, the first information comprises a service identifier.

In a preferred embodiment, the first information further comprises a random number.

In a preferred embodiment, the digital identity client further comprises:

an account validation module, for performing account-level validation according to the identifier after receiving the first request, wherein the signing module is configured to acquire the public key and the private key corresponding to the identifier after the account-level validation succeeds, and digitally sign the first information using the private key to acquire the signature information; and the sending module is configured to send the public key and the signature information to the application.

In a preferred embodiment, the second request further comprises a hash value of the identifier;

the first node further comprises:

a searching module, for performing a hash operation on the public key to acquire a public key address, and searching the first blockchain for an identifier hash value and a successfully validated identity verification type corresponding to the public key address; and a validation module, for performing signature validation on the signature information using the public key, and if the signature validation succeeds and the identifier hash value found on the first blockchain is identical to the identifier hash value in the second request, sending to the application the successfully validated identity verification type as the checking result.

In a preferred embodiment, the application further comprises: an identity verification strength determination module, for determining whether the successfully validated identity verification type in the checking result meets a service requirement; and a service querying module, for, if the successfully validated identity verification type in the checking result does not meet the service requirement, querying, a second node of second blockchain used to publish identity verification services, for an available identity verification service, and selecting, from a query result, an identity verification service meeting the service requirement, wherein the request sending module is further configured to send a third request to the digital identity client, the third request comprising a type of the selected identity verification service;

the digital identity client further comprises a validation request module for sending a fourth request to a corresponding identity verification server according to the type of the identity verification service in the third request, the fourth request comprising the signature information and the public key; and the identity verification server comprises an update module for performing identity validation according to the third request, and updating the first blockchain with a received public key address, the successfully validated identity verification type, and the hash value of the identifier.

In a preferred embodiment, the update module sends to a node of the first blockchain the received public key, the successfully validated identity verification type, and the signature information, for the node to perform checking according to the received signature information and the public key, and updates the first blockchain with the successfully validated identity verification type corresponding to the public key if the checking succeeds.

In a preferred embodiment, the second node and an object requiring identity verification belong to the same country or region.

In a preferred embodiment, the identity verification server further comprises a service publishing module for sending to a third node of the second blockchain information about an available identity verification service, wherein the third node and the identity verification server belong to the same country or region; and the third node is configured to store the information about the identity verification service on the second blockchain, and spread the information to other nodes of the second blockchain comprising the second node.

In a preferred embodiment, the digital identity client further comprises a query module and a key generation module, wherein the query module is configured to query, a second node of second blockchain used to publish identity verification services, for an available identity verification service according to the received identifier, complete identity validation according to a query result by means of interaction with an identity verification server, and receive an identity validation result from the identity verification server;

the key generation module is configured to generate the paired public key and private key corresponding to the identifier, and compute a public key address;

the sending module of the digital identity client is further configured to send the public key address to the identity verification server; and the identity verification server comprises a validation module for performing identity validation, and storing a received public key address, the successfully validated identity verification type, and a hash value of the identifier on the first blockchain.

The present application further discloses an identity verification method, comprising:

receiving, by a fourth node of a third blockchain, identity verification information from an identity verification server, the identity verification information comprising a first hash value of information to be validated;

storing, by the fourth node, the identity verification information on the third blockchain, and spreading the identity verification information to a fifth node of the third blockchain by means of the third blockchain;

receiving, by the fifth node, an identity verification request from a first application, the identity verification request comprising a second hash value of the information to be validated; and comparing, by the fifth node, the first hash value and the second hash value, and returning an identity verification result to the first application according to a comparison result.

In a preferred embodiment, the fourth node and the identity verification server belong to the same country or region; and the fifth node and the identity verification server do not belong to the same country or region.

In a preferred embodiment, the fifth node and the first application belong to the same country or region.

In a preferred embodiment, the first hash value and the second hash value are acquired by using the same hash algorithm.

In a preferred embodiment, returning the identity verification result to the first application according to the comparison result further comprises:

returning, by the fifth node, to the first application information indicating that identity verification succeeds if the first hash value and the second hash value are the same; and returning, by the fifth node, to the first application information indicating that the identity verification fails if the first hash value and the second hash value are different.

In a preferred embodiment, the identity verification information further comprises identifier information of a user whose identity is to be verified;

the identity verification request further comprises the identifier information of the user to be verified; and before the fifth node compares the first hash value and the second hash value, the method further comprises: searching, according to the identifier information in the identity verification request, information stored on the third blockchain for identity verification information having the same identifier information, so as to find the first hash value.

In a preferred embodiment, the information to be validated comprises one or any combination of the following:

fingerprint information, facial feature information, and bank account information.

The present application further discloses an identity verification system, comprising an identity verification server, a third blockchain, and a first application, wherein the identity verification server is configured to send identity verification information to a fourth node of the third blockchain, the identity verification information comprising a first hash value of information to be validated;

the fourth node is used to store the identity verification information on the third blockchain, and spread the identity verification information to a fifth node of the third blockchain by means of the third blockchain;

the first application is configured to send an identity verification request to the fifth node, the identity verification request comprising a second hash value of the information to be validated; and the fifth node is configured to compare the first hash value and the second hash value, and return an identity verification result to the first application according to a comparison result.

In a preferred embodiment, the fourth node and the identity verification server belong to the same country or region; and the fifth node and the identity verification server do not belong to the same country or region.

In a preferred embodiment, the fifth node and the first application belong to the same country or region.

In a preferred embodiment, the first hash value and the second hash value are acquired by using the same hash algorithm.

In a preferred embodiment, the fifth node returns to the first application information indicating that identity verification succeeds if the comparison result indicates that the first hash value and the second hash value are the same, and returns to the first application information indicating that the identity verification fails if the comparison result indicates that the first hash value and the second hash value are different.

In a preferred embodiment, the identity verification information further comprises identifier information of a user whose identity is to be verified;

the identity verification request further comprises the identifier information of the user whose identity is to be verified; and the fifth node is further configured to search, according to the identifier information in the identity verification request, information stored on the third blockchain for identity verification information having the same identifier information, so as to find the first hash value.

In a preferred embodiment, the information to be validated comprises one or any combination of the following:

fingerprint information, facial feature information, and bank account information.

The present application further discloses an identity verification system, comprising:

a memory, for storing computer-executable instructions; and a processor, for implementing the steps of the method described above when executing the computer-executable instructions.

The present application further discloses a computer-readable storage medium storing computer-executable instructions, when executed by a processor, implementing the steps of the method described above.

In an embodiment of the present application, identity verification is performed by using the blockchain technology, so that transnational identity verification can be performed under conditions that data leaving countries is controlled by the respective countries.

On the basis of the blockchain technology, a cross-border identity verification network system is established between countries and regions, and blockchain is used to prevent tampering and achieve traceability. Different nodes are deployed in different countries, and a trade-off between protection of privacy and convenience of calling is achieved between a domestic service and transnational calling.

In an embodiment of the present application, an identity verification server of a domiciled country/region performs a hash operation on sensitive information to be validated, so that a hash value of the sensitive information instead of the sensitive information itself is uploaded to blockchain by means of a node in the domiciled country/region, and spread to other countries or regions by means of the blockchain. An application requiring an identity verification service in other countries or regions submits an identity verification request to a node of a country or region (namely a calling country/region) in which the application is located, and the identity verification request also carries a hash value of information to be validated. A blockchain node of the calling country/region determines whether the hash value in the identity verification request is the same as a hash value stored in the blockchain, and if so, returns to the application a message indicating that identity verification succeeds, if not, returns to the application a message indicating that identity verification fails. By means of this technical solution, identity verification can be successfully performed while in compliance of the regulations of respective countries for controlling data leaving the countries.

The specification of the present application records a large number of technical features distributed in technical solutions. Listing all of possible combinations (namely the technical solutions) of the technical features of the present application will cause the specification to be lengthy. In order to avoid this problem, the technical features disclosed in summary of the present application, the technical features disclosed in the following embodiments and examples, and the technical features disclosed in the accompanying drawings can all be freely combined with each other so as to form a variety of new technical solutions (these technical solutions are all considered to have been recorded in the specification), unless combination of the technical features is technically impractical. For example, features A+B+C are disclosed in an example, and features A+B+D+E are disclosed in another example. However, the features C and D are technical means equivalent to each other, and achieve the same effect. Technically, one of the features C and D needs to be adopted, and it is impossible that both the features C and D are adopted. The feature E and the feature C can be technically combined with each other. Then, the solution of A+B+C+D is technically impractical, and therefore should not be considered to have been recorded. However, the solution of A+B+C+E should be considered to have been recorded.

DETAILED DESCRIPTION OF THE EMBODIMENTS

Figure 1:
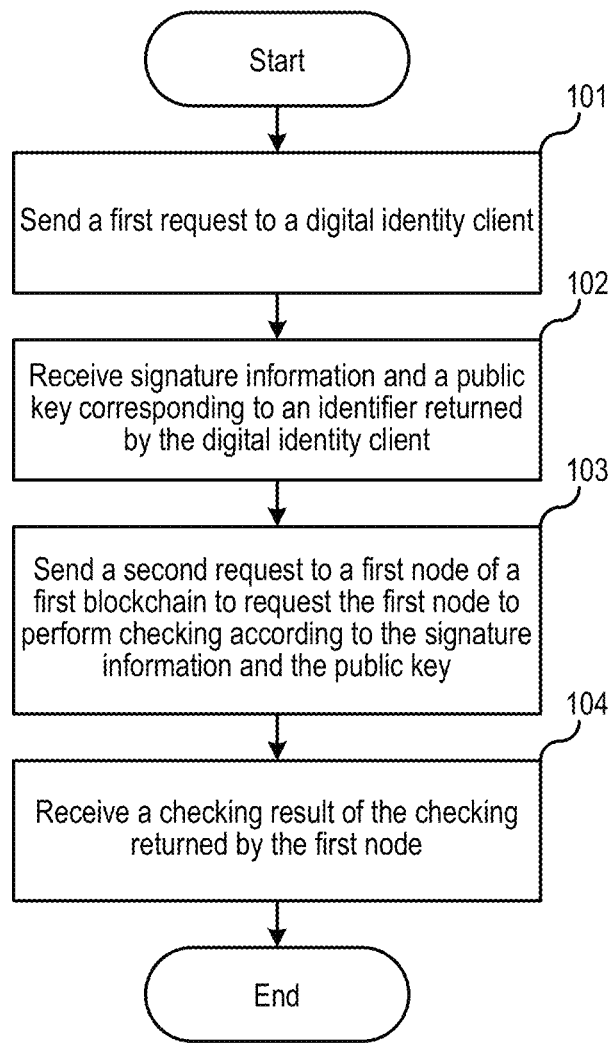
FIG. 1 is a schematic flowchart of an identity verification method according to a first embodiment of the present application.

In order to allow readers to better understand the present application, the following description provides a great number of technical details. However, a person of ordinary skill in the art can understand that the technical solutions that the present application seek to protect can also be implemented even if these technical details and various changes and modifications based on the following embodiments are not provided.

Description of Some of the Concepts:

An application refers to an application software system having a specific function. An application in embodiments of the present application generally refers to an application requiring an identity verification service.

A digital identity client is a client for performing digital identity validation. In an embodiment, the digital identity client is application software, and has an account system. Each user can register an account system of a domiciled country thereof, and a local identity verification service of a current country provides an account login function and the like. In an embodiment, the digital identity client is also a digital identity wallet of a user, and documents in the wallet are stored on a server of the current country. The identity wallet includes information such as a passport, an ID card of the current country, and the like. When registration is performed on a website by using a certain document, it is first checked whether an identity wallet thereof includes the document, and a real-person real-document service (identification) of the current country is accessed. After identity authentication (identification) of the current country is ended, the digital identity client can generate a public-private key pair by means of a secure region, such as a TEE/SE, managed thereby. A public key address is transmitted to the blockchain, and the wallet also records information such as the public key, a current version number, and the like. The corresponding private key is stored in the secure region. Optionally, a public key address computation method is (Base58 (version+ripemd160 (SHA256(public key))+checksum). This computation method can prevent excessive cracking after the public key is disclosed.

An identity verification server is a serving party for providing an identity verification service. In an embodiment, the identity verification service is provided locally (domestically or regionally). In an embodiment, the identity verification server is implemented using cloud computing. In an embodiment, the identity verification service mainly provides two functions. One function is to perform real-person real-document checking on identity of a domestic/local citizen, and up-chain the types of checking performed for a user and a unique identification index of the user. The other function is to publish the domestic/local identity verification service to an identity verification service publishing blockchain (namely, second blockchain), so that services in other countries/regions needing the service can subscribe to the service. Each country has strict requirements on data leaving the country. Therefore, each country can deploy the identity verification service domestically, and required identity verification data sources are all deployed domestically, and can accept a direct connection service of other countries, thereby ensuring that sensitive data cannot leave the country. In addition, the domestic identity verification service also provides account management for domestic users. Only an alliance node (namely an authenticated service provider) can publish a service. The alliance node needs to add a signature thereof each time a service is published.

An identity verification blockchain is first blockchain. In an embodiment, the blockchain stores a public key address of a user and validates the identity verification services performed on a current public key of the user. The blockchain can also be used for comparison of a public key address corresponding to an authentication currently submitted by the user and signature checking. Data on this blockchain is key data for implementing transnational validation. Important functions of this blockchain are basic services of a PKI, and include: 1a, storage of public key addresses of users; 2, a signature checking operation performed on a digital signature; 3, computation for determining whether an uploaded public key matches a public key address.

An identity verification service publishing blockchain is the second blockchain. In an embodiment, this blockchain is responsible for services externally provided by different service providers of each country. Service providers of each country can also subscribe to identity authentication services of other countries. In principle, this service provides only an identity checking service (only returning yes or no). A service user of a calling country can customize which services meet a service strength requirement thereof. Citizens of each country have some identity authentication (identification) tools provided by the government or some companies, so as to determine who you are. For example, the public security department of China provides services such as comparison of names, ID number, faces of citizens. If both static information and biological information provided by a person A match comparison sources of the public security department, then it can be determined that the information of person A is trustworthy, and it is considered that real-person real-document checking is performed, thereby determining that the person providing the information is person A himself. However, each country has somehow strict control on sensitive information of citizens. For example, a country A does not want other countries to acquire (or store) facial data of domestic citizens, and an application of a country B wants to perform a face-level strong identity verification operation due to considerations regarding risks and the like. In this case, a service provider AS of country A only needs to publish a domestic face checking service to the identity verification service publishing blockchain, and a service provider BS of other countries, such as country B, can subscribe to the service. If BS thinks that AS is reliable, then AS can be accessed by means of the digital identity client, and no data needs to be stored.

IFAA: internet finance authentication alliance. In order to adapt to development of new checking methods such as biometric checking, provide authentication methods that are secure and have better user experience, and provide support for rapidly developing Internet financial services, a set of solutions of using biological features to authorize access is created by means of cooperation with equipment manufacturers, chip manufacturers, algorithm vendors, security vendors, standards organizations, and testing organizations.

FIDO: Fast Identity Online (FIDO) alliance. The FIDO alliance is an industry association established in July 2012, and aims to meet market demands and meet online validation requirements. This protocol is the first open industry standard for online and digital validation; it improves security, protects privacy, and simplifies user experience. A user can log in by using a variety of methods such as a fingerprint collection device on a smart phone, a USB token, and the like, and a service provider no longer needs to maintain a complex and expensive authentication background.

Hash: a function for compressing information of any length to a message digest of a certain fixed length.

Public key address: data acquired by performing a specific hash operation according to a public key.

To make the objectives, technical solutions, and advantages of the present application clearer, embodiments of the present application will be described below in further detail with reference to the accompanying drawings.

A first embodiment of the present application relates to an identity verification method, and a process thereof is shown in FIG. 1. The method includes the following steps:

In step 101, an application requiring an identity verification service sends a first request to a digital identity client, the first request including an identifier and first information. Optionally, the first information includes a service identifier. Including a service identifier in the first information makes an identity verification behavior to be associated with a specific service. Optionally, the first information includes a service identifier and a random number, and the random number can also be referred to as a challenge value. Including a random number in the first information for signature can prevent playback attacks. Optionally, the first information includes information of one or a plurality of features of a service.

Then, in step 102, the application receives signature information and a public key corresponding to the identifier returned by the digital identity client, wherein the signature information is acquired by the digital identity client by using a private key corresponding to the public key to digitally sign the first information. In an embodiment, the digital identity client runs in a user terminal. In an embodiment, the digital identity client and an identity verification object belong to the same country or region. The identity verification object is a person whose identity needs to be verified. In another embodiment, the digital identity client and an identity verification object may not belong to the same country or region, as long as the digital identity client is not legally prohibited from acquiring sensitive information of the identity verification object involved in identity verification.

Then, in step 103, the application sends a second request to a first node of first blockchain, the second request including the signature information and the public key, so that the first node performs checking according to the signature information and the public key. In an embodiment, the first node and the application belong to the same country or region. In other words, the first node can also be referred to as a calling country/region node. In another embodiment, the first node and the application may not belong to the same country or region, as long as the application is not legally prohibited from accessing the first node.

Then in step 104, the application receives a checking result of the checking returned by the first node, and performs identity verification according to the checking result.

Figure 2:
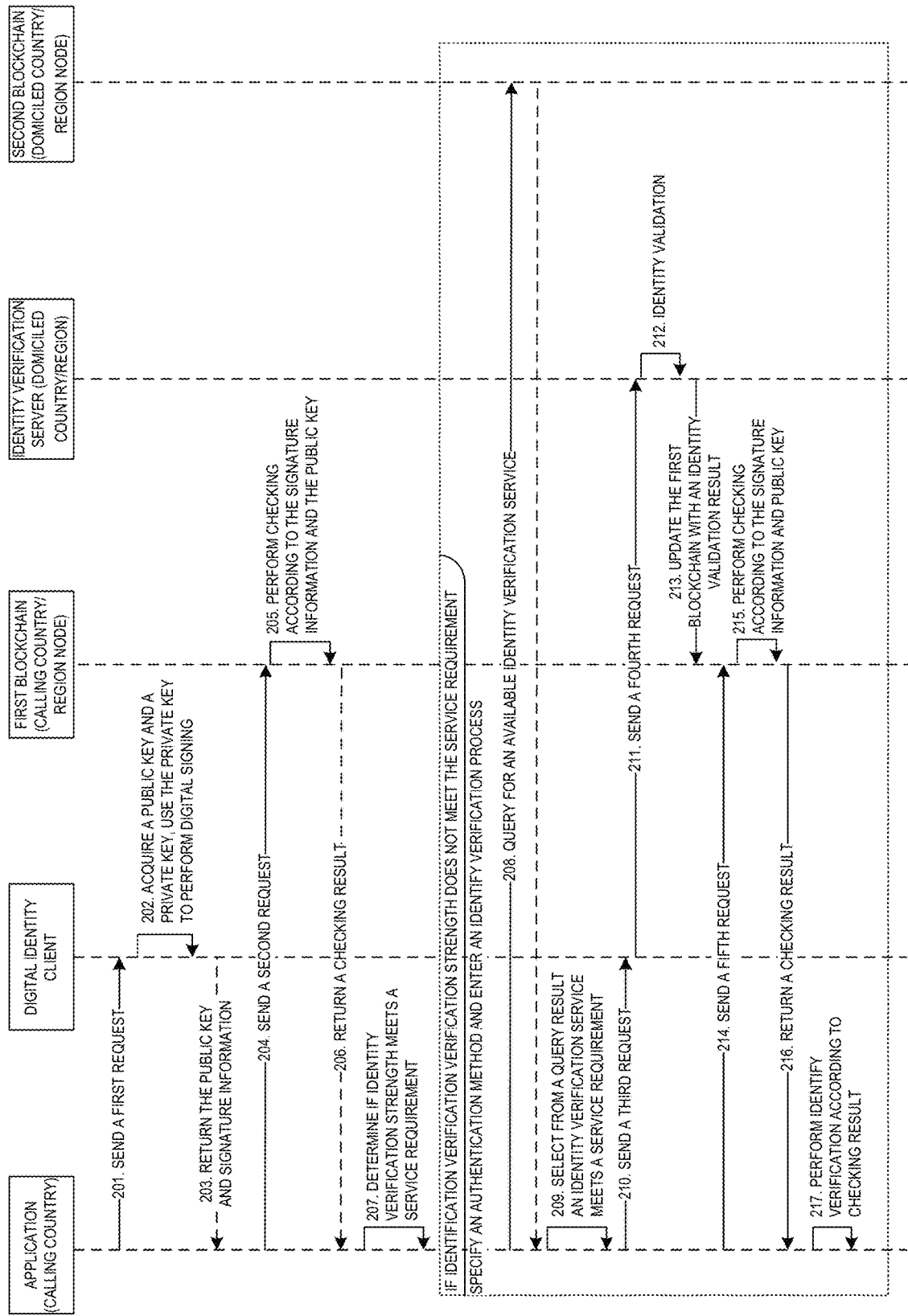
FIG. 2 illustrates an exemplary process of identity verification according to a second embodiment of the present application.

A second embodiment of the present application relates to an identity verification method, and a process thereof is shown in FIG. 2. The first embodiment mainly describes behaviors of an application in an identity verification process. The second embodiment describes, from the angle of a whole system (the system includes an application, a digital identity client, blockchains, an identity verification server, and the like), how parts interact with each other to implement identity verification.

In step 201, an application requiring an identity verification service sends a first request to a digital identity client, the first request including an identifier and first information. This step is the same as step 101.

Then in step 202, upon receiving the first request, the digital identity client acquires, according to the identifier therein, a corresponding public key and a corresponding private key, and uses the private key to digitally sign the first information to acquire signature information. Optionally, account-level validation needs to be performed before digital signing is performed.

Then in step 203, the digital identity client sends the public key and the signature information to the application. Optionally, a version number used during generation of the public key and the private key is sent to the application at the same time.

Then in step 204, the application sends a second request to a first node of first blockchain, the second request including the signature information and the public key. Optionally, the second request further includes a hash value of the identifier.

Then in step 205, upon receiving the second request, the first node performs checking according to the signature information and the public key therein. Optionally, the step further includes: the first node computing a public key address according to the public key, and searching the first blockchain for an identifier hash value and a successfully validated identity verification type corresponding to the public key address. The first node uses the public key to perform signature validation on the signature information, and if the signature validation succeeds and the identifier hash value found on the first blockchain is identical to the identifier hash value in the second request, sends to the application the successfully validated identity verification type as a checking result, and otherwise, returns to the application information indicating that identity checking fails. In an embodiment, the second request may not include the identifier hash value, and correspondingly, the first node may not check whether the identifier hash value in the second request is identical to the identifier hash value in the first blockchain.

Then in step 206, the digital identity client returns a checking result to the application, the checking result including a successfully validated identity verification type.

Then in step 207, the application determines whether the successfully validated identity verification type in the checking result meets a service requirement; if so, identity verification succeeds, and the identity verification process ends; if not, step 208 is executed. In some embodiments, the successfully validated identity verification type can also be referred to as the strength of the identity verification.

In step 208, the application queries, a second node of second blockchain used to publish identity verification services, for an available identity verification service. Optionally, the second node and an object requiring identity verification belong to the same country or region.

Then in step 209, the application selects, from a query result returned by the second node, an identity verification service meeting the service requirement.

Then in step 210, the application sends a third request to the digital identity client, the third request including a type of the selected identity verification service.

Then in step 211, the digital identity client sends a fourth request to a corresponding identity verification server according to the type of the identity verification service in the third request, the fourth request including the signature information and the public key.

Then in step 212, the identity verification server performs identity validation.

Then in step 213, the identity verification server updates the first blockchain with a received public key address, the successfully validated identity verification type, and the hash value of the identifier. In an embodiment, this step further includes: the identity verification server sends to a node of the first blockchain the received public key, the successfully validated identity verification type, and the signature information, and the node performs checking according to the received signature information and public key, and updates the first blockchain with the successfully validated identity verification type corresponding to the public key if the checking succeeds. In FIG. 2, the identity verification server updates the first blockchain by means of the calling country/region node; in other embodiments, the identity verification server can update the blockchain by means of any node of the first blockchain.

Then in step 214, the application sends a fifth request to the first node of the first blockchain, the fifth request including the signature information and the public key.

Then in step 215, the first node performs checking according to the signature information and the public key in the fifth request, and returns a checking result in step 216.

Then in step 217, the application receives the checking result returned by the first node and performs identity verification according to the same.

Figure 3:
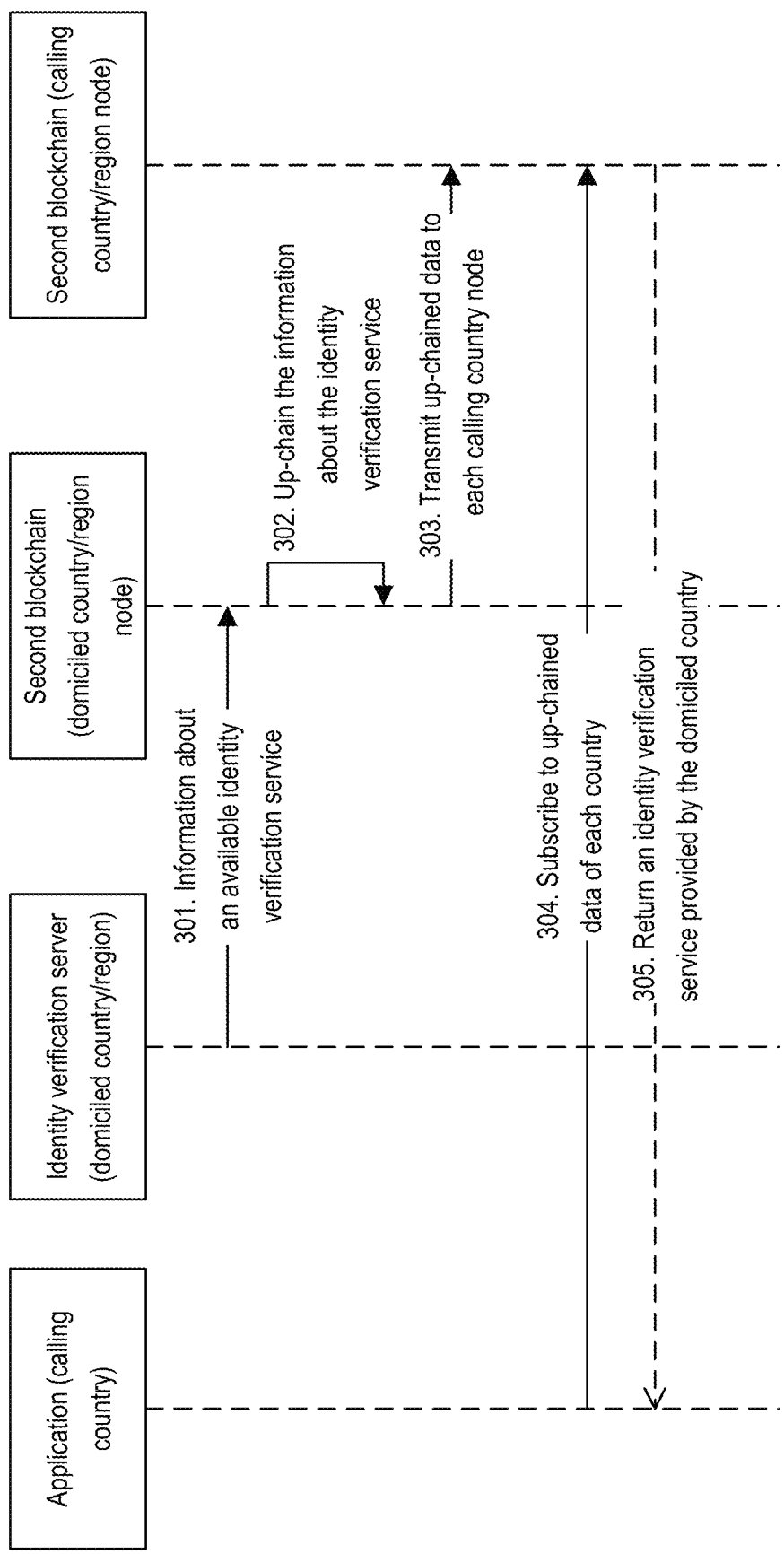
FIG. 3 illustrates an exemplary process of publishing of and subscribing to an identity verification service according to the second embodiment of the present application.

The second blockchain is blockchain for publishing of and subscribing to an identity verification service. Steps 208 and 209 are substantially subscription to an identity verification service. A process of publishing of and subscribing to an identity verification service is described below with reference to FIG. 3.

In step 301, the identity verification server sends to a third node of the second blockchain information about available identity verification services, wherein the third node and the identity verification server belong to the same country or region (or it can also be referred to as a domiciled country/region node). There are a plurality of types of identity verification services, such as facial validation and the like. Optionally, information sent by the identity verification server can be an identifier of a publishing organization, a type of the identity verification service, related checking data, and the like.

Then in step 302, the third node stores, on the second blockchain, the information about the identity verification service. This step can also be referred to as up-chaining the information about the identity verification service (up-chaining is storing, on the blockchain, the information).

Then in step 303, the third node spreads to other nodes of the second blockchain the up-chained information about the identity verification service, wherein the other nodes include the second node (also referred to as a calling country/region node). At this point, publishing of the identity verification service is completed.

Then in step 304, an application requiring the identity verification service subscribes to the up-chained identity verification service by means of the second node.

Then in step 305, the second node returns the information about the identity verification service to the application. If the information about the identity verification service subscribed to is updated afterwards, then updated content will be automatically sent to the application having subscribed thereto. At this point, subscription to the identity verification service is completed.

Figure 4:
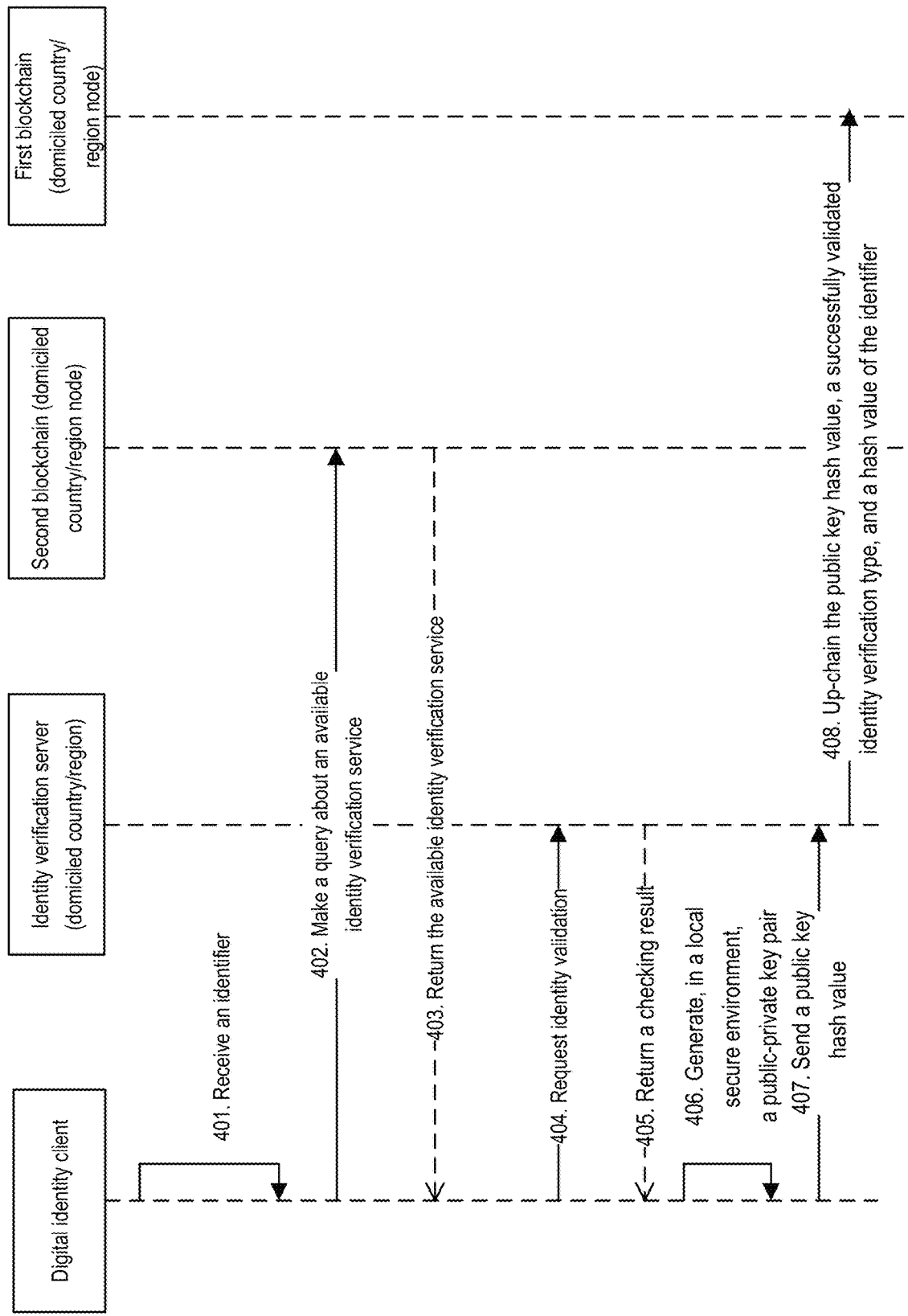
FIG. 4 illustrates an exemplary process of up-chaining an identity verification type having been validated by an identity verification server according to the second embodiment of the present application.

Steps 201 to 206 can be regarded as querying, by means of the first blockchain, the up-chained identity verification type having been validated by the identity verification server. The following describes how to up-chain an identity verification type having been validated by an identity verification server. The process is shown in FIG. 4.

In step 401, a digital identity client receives an identifier. In an embodiment, according to an identifier of the checker input to the digital identity client, account-level validation (such as gesture-based decryption, password-based decryption, fingerprint-based decryption, or the like) is performed first; it is determined, by means of a query, whether the digital identity client includes an identifier corresponding to the checker identifier.

Then in step 402, the digital identity client queries, a second node of second blockchain used to publish identity verification services, for an available identity verification service. In an embodiment, the second node is a domiciled country/region node.

Then in step 403, the second node returns an available identity verification service.

Then in step 404, the digital identity client completes identity validation according to a query result by means of interaction with an identity verification server. The interaction includes the digital identity client sending a message for requesting identity validation, and other necessary interaction (e.g., sending identification documents for verification).

Then in step 405, the identity verification server returns an identity validation result.

Then in step 406, the digital identity client receives the identity validation result from the identity verification server, and generates, in a local secure environment, a pair of keys (including a public key and a private key) corresponding to the identifier. In an embodiment, the digital identity client generates a public-private key pair in a secure region (such as a TEE, an SE, or the like) of a mobile phone on the basis of secure elliptic curve cryptography (ECC), stores the private key in a local secure region, and stores the public key locally. The public key has a length of 64 bytes (for the public key of the ecc algorithm, x and y are compulsorily 32 bytes, and padding is performed by using 0; padding is not performed by using 0 if the first byte is greater than 1; all are positive numbers), (Base58(version+ripemd160 (SHA256(public key))+checksum). Base58 is a subset of Base64; some symbols, such as 0, O, 1, I, the symbol "+" and the symbol "/" which are likely to cause confusion, are filtered out; ripemd160 and sha256 are two hash algorithms; version is a version number and is 01 by default; a checksum is a CRC16 checksum (2 bytes) of the value following ripemd160. After the public key and the private key are generated, access to the private key is protected on the basis of a biometric validation method such as IFAA, FIDO, or the like.

Then in step 407, the digital identity client computes a public key address and sends the public key address to the identity verification server. Optionally, the version number can also be sent to the identity verification server at the same time.

Then in step 408, the identity verification server up-chains (namely, storing on first blockchain) the received public key address, a successfully validated identity verification type, and a hash value of the identifier. The public key address, the successfully validated identity verification type, and the hash value of the identifier form one record. The corresponding successfully validated identity verification type and hash value of the identifier can be queried according to the public key address. Optionally, the identity verification server can also up-chain the version number at the same time.

Figure 5:
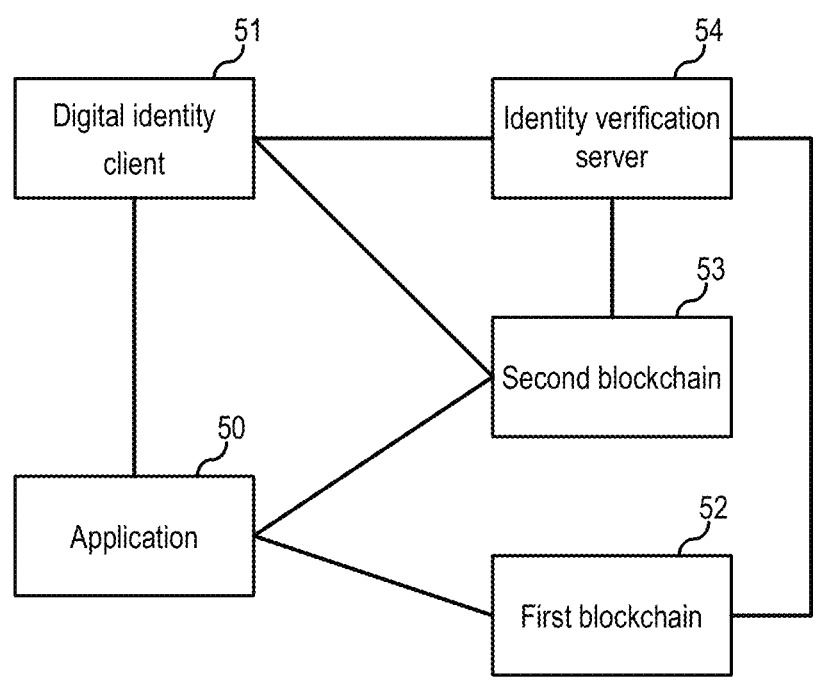
FIG. 5 is a schematic structural view of an identity verification system according to a third embodiment of the present application.

A third embodiment of the present application relates to an identity verification system having a structure shown in FIG. 5. The identity verification system includes: an application 50 requiring an identity verification service, a digital identity client 51, first blockchain 52, second blockchain 53, and an identity verification server 54.

The application includes a request sending module and an identity verification module. The request sending module is for sending a first request to the digital identity client, the first request including an identifier and first information, and sending a second request to a first node of the first blockchain, the second request including signature information and a public key returned by the digital identity client. The identity verification module is for performing identity verification according to a checking result returned by the first node. Optionally, the first information includes a service identifier. Including a service identifier in the first information makes that an identity verification behavior can be associated with a specific service. Optionally, the first information includes a service identifier and a random number, and the random number can also be referred to as a challenge value. Including a random number in the first information for signature includes can prevent playback attacks. Optionally, the first information includes information of one or a plurality of features of a service.

The digital identity client includes a signing module and a sending module. The signing module is for using a private key corresponding to the identifier in the first request to digitally sign the first information to acquire the signature information. The sending module is for returning to the application the signature information and the public key corresponding to the identifier. Optionally, the digital identity client runs in a user terminal. The digital identity client and an identity verification object belong to the same country or region.

The first node includes a checking module for performing checking according to the signature information and the public key in the second request, and returning the checking result to the application. Optionally, the first node and the application belong to the same country or region.

Optionally, the digital identity client further includes: an account validation module, for performing account-level validation according to the identifier after receiving the first request. The signing module is for, after the account-level validation succeeds, acquiring the public key and the private key corresponding to the identifier, and using the private key to digitally sign the first information to acquire the signature information. The sending module is for sending the public key and the signature information to the application.

Optionally, the second request further includes a hash value of the identifier. The first node further includes a searching module and a validation module. The searching module is for performing a hash operation on the public key to acquire a public key address, and searching the first blockchain for an identifier hash value and a successfully validated identity verification type corresponding to the public key address. The validation module is for using the public key to perform signature validation on the signature information, and if the signature validation succeeds and the identifier hash value found on the first blockchain is identical to the identifier hash value in the second request, sending to the application the successfully validated identity verification type as the checking result. Otherwise, information indicating that identity checking fails is returned to the application. In an embodiment, the second request may not include the identifier hash value, and the first node may not check whether the identifier hash value in the second request is identical to the identifier hash value in the first blockchain.

Optionally, the application further includes: an identity verification strength determination module, for determining whether the successfully validated identity verification type in the checking result meets a service requirement; and a service querying module, for, if the successfully validated identity verification type in the checking result does not meet the service requirement, querying, a second node of second blockchain used to publish identity verification services, for an available identity verification service, and selecting, from the query result, an identity verification service meeting the service requirement. The request sending module is further for sending a third request to the digital identity client, the third request including a type of the selected identity verification service. The digital identity client further includes a validation request module for sending a fourth request to a corresponding identity verification server according to the type of the identity verification service in the third request, the fourth request including the signature information and the public key. The identity verification server includes an update module for performing identity validation according to the third request, and updating the first blockchain with a received public key address, the successfully validated identity verification type, and the hash value of the identifier. The second node and an object requiring identity verification belong to the same country or region.

Optionally, the update module sends to a node of the first blockchain the received public key, the successfully validated identity verification type, and the signature information, so that the node performs checking according to the received signature information and public key, and updates the first blockchain with the successfully validated identity verification type corresponding to the public key if the checking succeeds.

Optionally, the identity verification server further includes a service publishing module for sending to a third node of the second blockchain information about the available identity verification service, wherein the third node and the identity verification server belong to the same country or region. The third node is for storing, on the second blockchain, the information about the identity verification service, and spreading the same to other nodes of the second blockchain, wherein the other nodes include the second node.

Optionally, the digital identity client further includes a query module and a key generation module. The query module is for querying, a second node of second blockchain used to publish identity verification services, for an available identity verification service according to the received identifier, completing identity validation according to a query result by means of interaction with an identity verification server, and receiving an identity validation result from the identity verification server. The key generation module is for generating the paired public key and private key corresponding to the identifier, and computing a public key address. The sending module of the digital identity client is further for sending the public key address to the identity verification server. The identity verification server includes a validation module for performing identity validation, and updating the first blockchain with a received public key address, the successfully validated identity verification type, and a hash value of the identifier.

The first and second embodiments are method embodiments corresponding to this embodiment. The technical details in the first and second embodiments can be applied to this embodiment, and the technical details of this embodiment can also be applied to the first and second embodiments.

Figure 6:
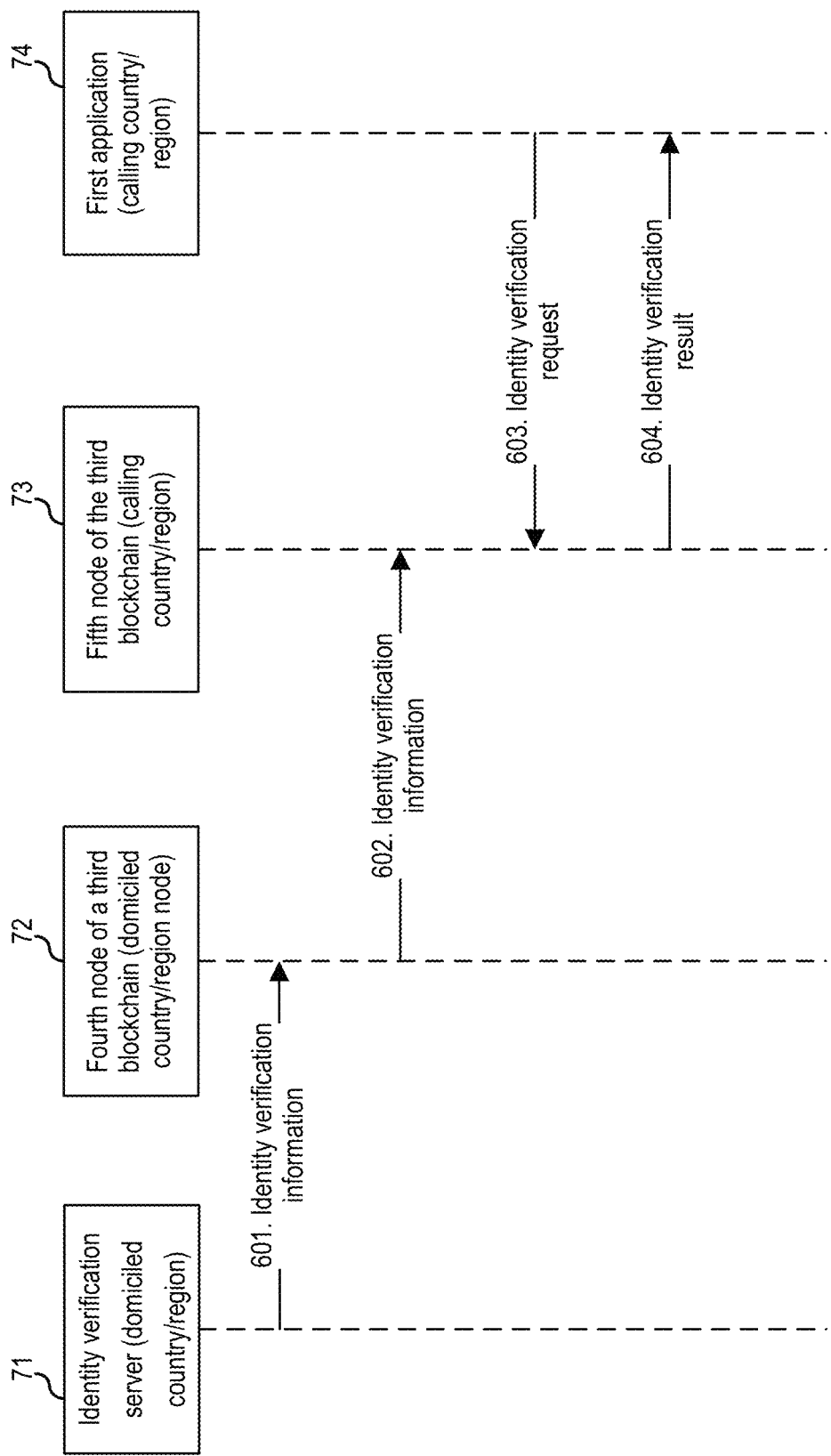
FIG. 6 illustrates an exemplary process of identity verification according to a fourth embodiment of the present application.

A fourth embodiment of the present application relates to an identity verification method, and a process thereof is shown in FIG. 6.

In this embodiment, it needs to be determined by means of validation whether information to be validated belongs to a user (a user whose identity is to be verified). For example, it needs to be determined by means of validation whether a fingerprint of a user is the same as a fingerprint of the user in an identity verification server. However, the law of the domiciled country/region of the user may prohibit fingerprint information from leaving the country/region. In this case, fingerprint validation cannot be performed outside the domiciled country/region. In this embodiment, an identity verification server uploads a hash value of a fingerprint to a domiciled country/region node of blockchain; the node spreads the hash value of the fingerprint to other nodes of the blockchain outside the domiciled country/region; an application that belongs to a calling country/region and needs to perform fingerprint validation can send an acquired hash value of the fingerprint to a node of the blockchain in the calling country/region; the calling country/region node compares the fingerprint hash value received from the application with the fingerprint hash value stored in the blockchain, and if the two fingerprint hash values are the same, returns identity verification success information to the application, and otherwise, returns identity verification failure information. In this way, fingerprint validation is successfully implemented while data control regulations of a domiciled country/region are followed.

In step 601, an identity verification server sends identity verification information to a node (herein referred to as a fourth node) of a third blockchain. The identity verification information includes identifier information of a user whose identity is to be verified and a hash value (herein referred to as a first hash value) of information to be validated. The information to be validated can be fingerprint information (or feature information of a fingerprint), facial feature information, bank account information, or the like. The identifier information of the user whose identity is to be verified is information for uniquely identifying the user whose identity is to be verified, such as an ID number, a driver's license number, a social security number, or the like, or a value derived from the ID number, the driver's license number, the social security number, or the like (for the purpose of confidentiality) by means of a certain algorithm (such as a hash algorithm), such as a hash value of the ID number or the like.

Then in step 602, the fourth node of the third blockchain receives the identity verification information from the identity verification server, stores the identity verification information on the third blockchain, and spreads the identity verification information to other nodes of the third blockchain.

Then in step 603, a first application requiring identity verification acquires information to be validated, performs a hash operation on the same, and sends an identity verification request to a node (herein referred to as a fifth node) of the third blockchain, the identity verification request including a hash value (herein referred to as a second hash value) of the information to be validated and identifier information of a user whose identity is to be verified. Generally, the first hash value and the second hash value are acquired by using the same hash algorithm.

Then in step 604, the fifth node receives the identity verification request from the first application, compares the first hash value in the request and the second hash value stored in the third blockchain, and returns an identity verification result to the first application according to a comparison result. In an embodiment, if the first hash value and the second hash value are the same, the fifth node returns to the first application information indicating that identity verification succeeds; if the first hash value and the second hash value are different, the fifth node returns to the first application information indicating that the identity verification fails. In an embodiment, the fifth node searches, according to the identifier information in the identity verification request, information stored in the third blockchain for identity verification information having the same identifier information, so as to find the first hash value.

Optionally, the fourth node and the identity verification server belong to the same country or region. The fifth node and the identity verification server do not belong to the same country or region. The fifth node and the first application belong to the same country or region.

A fifth embodiment of the present application relates to an identity verification system, and as shown in FIG. 6, the system includes an identity verification server, a third blockchain (including a fourth node and a fifth node), and a first application:

Identity verification server 71 is for sending identity verification information to fourth node 72 of the third blockchain, the identity verification information including a first hash value of information to be validated and identifier information of a user whose identity is to be verified. The information to be validated can be fingerprint information (or feature information of a fingerprint), facial feature information, bank account information, or the like. The identifier information of the user whose identify is to be verified is information for uniquely identifying the user whose identity is to be verified, such as an ID number, a driver's license number, a social security number, or the like, or a value derived from the ID number, the driver's license number, the social security number, or the like by means of a certain algorithm (such as a hash algorithm), such as a hash value of the ID number or the like.

Fourth node 72 is for storing, on the third blockchain, the identity verification information, and spreading the identity verification information to other nodes of the third blockchain by means of the third blockchain, the other nodes including the fifth node.

First application 74 is for sending an identity verification request to fifth node 73, the identity verification request including a second hash value of the information to be validated and the identifier information of the user whose identity is to be verified. In an embodiment, the first hash value and the second hash value are acquired by using the same hash algorithm.

Fifth node 73 is for comparing the first hash value and the second hash value, and returning an identity verification result to the first application according to a comparison result. In an embodiment, the fifth node returns to the first application information indicating that identity verification succeeds if the comparison result indicates that the first hash value and the second hash value are the same, and returns to the first application information indicating that the identity verification fails if the comparison result indicates that the first hash value and the second hash value are different. In an embodiment, the fifth node searches, according to the identifier information in the identity verification request, information stored by the third blockchain for identity verification information having the same identifier information, so as to find the first hash value.

In an embodiment, the fourth node and the identity verification server belong to the same country or region. The fifth node and the identity verification server do not belong to the same country or region. In an embodiment, the fifth node and the first application belong to the same country or region.

The fourth embodiment is a method embodiment corresponding to this embodiment. The technical details in the fourth embodiment can be applied to this embodiment, and the technical details of this embodiment can also be applied to the fourth embodiment.

Figure 7:
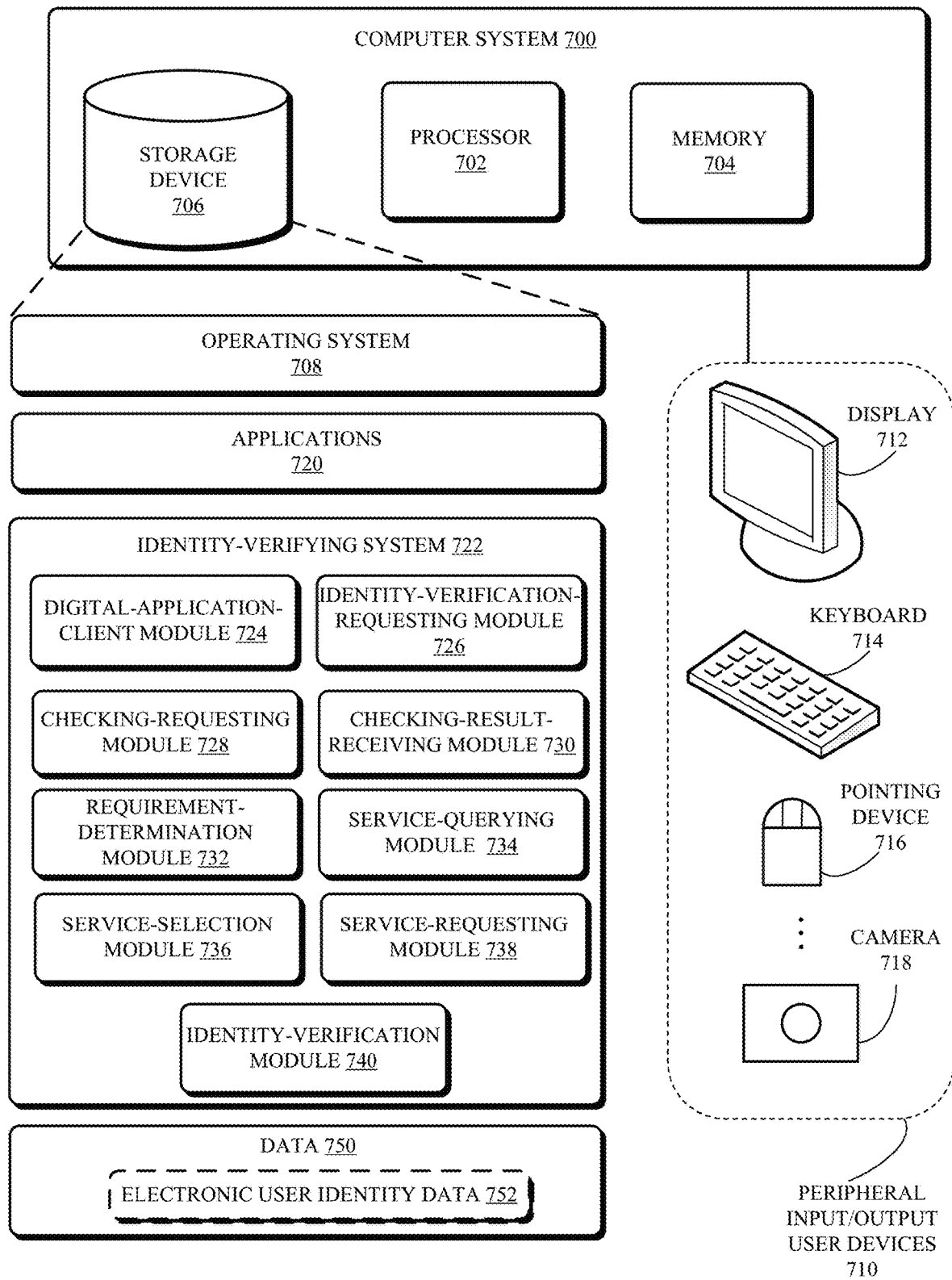
FIG. 7 illustrates an exemplary computer and communication system for identity verification, according to one embodiment.

FIG. 7 illustrates an exemplary computer and communication system for identity verification, according to one embodiment. In FIG. 7, computer system 700 can include a processor 702, a memory 704, and a storage device 706. Furthermore, computer system 700 can be coupled to peripheral input/output (I/O) user devices 710, e.g., a display device 712, a keyboard 714, a pointing device 716, and a camera 718. Storage device 706 can store an operating system 708, one or more applications 720, an identity-verification system 722, and data 750. In one embodiment, computer system 700 can be a mobile terminal device of a user.

Applications 720 can include instructions, which can be loaded from storage device 706 into memory 704 and executed by processor 702. As a result, computer system 700 can perform specific functions provided by applications 720.

Identity-verification system 722 can include instructions, which when executed by computer system 700, can cause computer system 700 or processor 702 to perform methods and/or processes described in this disclosure. Specifically, identity-verification system 722 can include instructions for implementing a digital identity client (digital-identity-client module 724), instructions for sending an identity-verification request from an application running on a user device to digital-identity-client module 724 (identity-verification-requesting module 726), instructions for sending a checking request to an identity-verification blockchain storing public key addresses and capable of performing signature checking (checking-requesting module 728), instructions for receiving from the identity-verification blockchain the checking result (checking-result-receiving module 730), instructions for determining whether the strength of the identity verification meets the service requirement (requirement-determination module 732), instructions for querying an identityverification-service-publishing blockchain for available identity verification services (service-querying module 734), instructions for selecting, from the query result, an identity-verification service meeting the service requirement (service-selection module 736), and instructions for sending a request specifying the selected identity-verification service to digital-client-client module 724 (service-requesting module 738). Note that, upon receiving the service request, digital-identity-client module 724 sends a request to the server of the corresponding identity-verification service for user identity verification. The validated identification information of the user can also be used to update the identity-verification blockchain. Identity-verification-requesting module 728 can send additional identity verification request to the identity-verification blockchain, and verification-result-receiving module 730 can receive, from the identity-verification blockchain, the verification result. Identity-verification system 722 can further include instructions for performing identity verification based on the received verification result (identity-verification module 740). Data 750 can optionally include electronic user identity data 752.

In some embodiments, applications 720 and the various modules in identity-verification system 722, such as modules 724-740 can be partially or entirely implemented in hardware and can be part of processor 702. Further, in some embodiments, the system may not include a separate processor and memory. Instead, in addition to performing their specific tasks, modules 720 and 724-740, either separately or in concert, may be part of general- or special-purpose computation engines.

Figure 8:
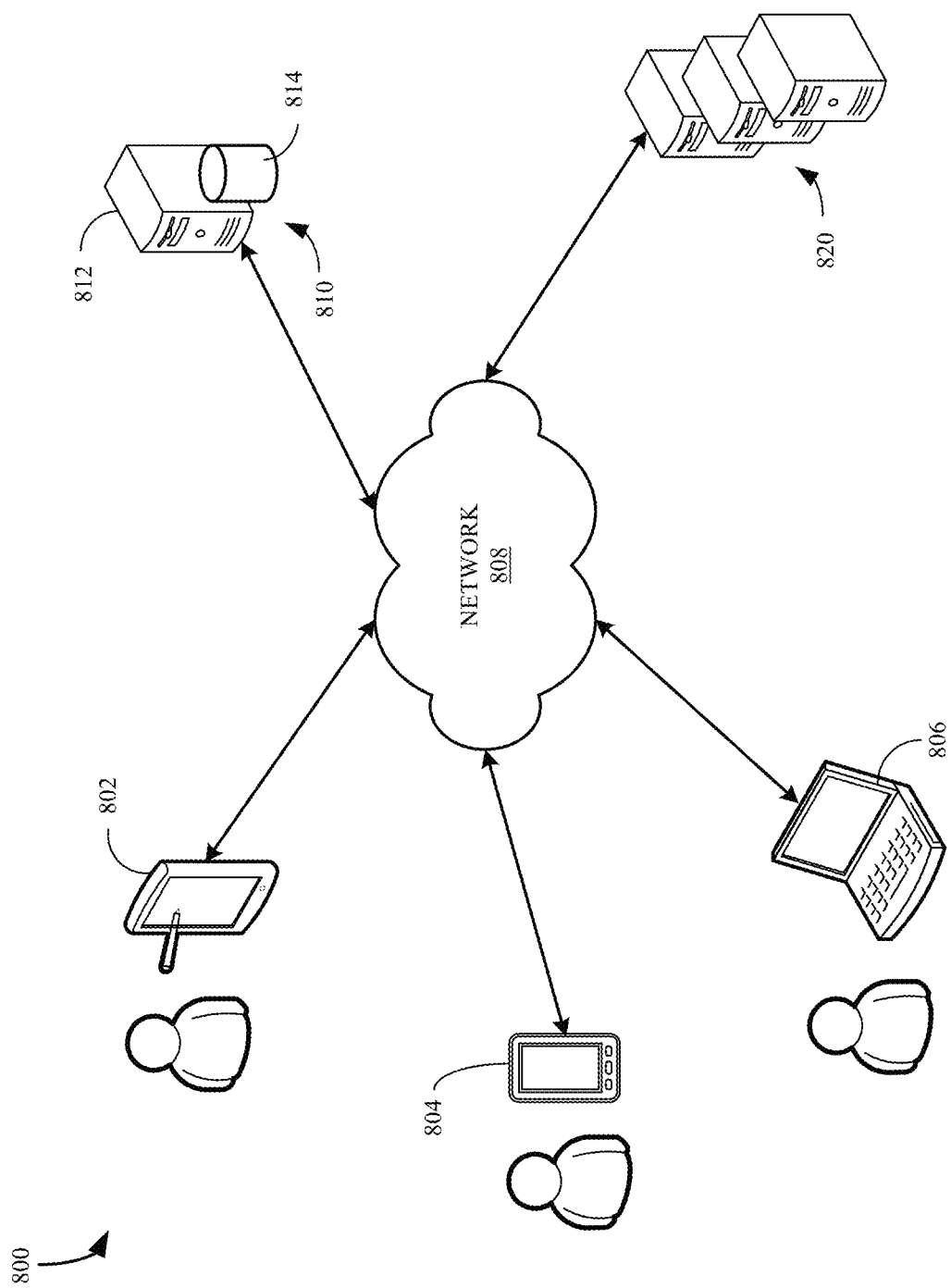
FIG. 8 illustrates an exemplary network environment for implementing the disclosed technology, in accordance with some embodiments described herein.

FIG. 8 illustrates an exemplary network environment for implementing the disclosed technology, in accordance with some embodiments described herein. A network environment 800 includes a number of electronic devices 802, 804 and 806 communicably connected to a server 810 by a network 808. One or more remote servers 820 are further coupled to the server 810 and/or the one or more electronic devices 802, 804 and 806.

In some exemplary embodiments, electronic devices 802, 804 and 806 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 802, 804 and 806 store a user agent such as a browser or application. In the example of FIG. 8, electronic device 802 is depicted as a tablet computer, electronic device 804 is depicted as a smartphone, and electronic device 806 is depicted as a laptop computer.

Server 810 includes a processing device 812 and a data store 814. Processing device 812 executes computer instructions stored in data store 814, for example, to assist in scheduling a customer-initiated service or a service-provider-initiated service between a service provider and a customer at electronic devices 802, 804 and 806 during a service scheduling process.

In some exemplary aspects, server 810 can be a single computing device such as a computer server. In other embodiments, server 810 can represent more than one computing device working together to perform the actions of a server computer (e.g., cloud computing). The server 810 may host the web server communicably coupled to the browser at the client device (e.g., electronic devices 802, 804 or 806) via network 808. In one example, the server 810 may host a client application for scheduling a customer-initiated service or a service-provider-initiated service between a service provider and a customer during a service scheduling process. Server 810 may further be in communication with one or more remote servers 820 either through the network 808 or through another network or communication means.

The one or more remote servers 820 may perform various functionalities and/or storage capabilities described herein with regard to the server 810, either alone or in combination with server 810. Each of the one or more remote servers 820 may host various services. For example, servers 820 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 820 can be a single computing device such as a computer server or can represent more than one computing device working together to perform the actions of a server computer (e.g., cloud computing). In one embodiment server 810 and one or more remote servers 820 may be implemented as a single server or a cluster of servers. In one example, server 810 and one or more remote servers 820 may communicate through the user agent at the client device (e.g., electronic devices 802, 804 or 806) via network 808.

Users may interact with the system hosted by server 810, and/or one or more services hosted by remote servers 820, through a client application installed at the electronic devices 802, 804, and 806. Alternatively, the user may interact with the system through a web-based browser application at the electronic devices 802, 804, and 806. Communication among client devices 802, 804, 806 and the system, and/or one or more services, may be facilitated through a network (e.g., network 808).

Communication among the client devices 802, 804, 806, server 810 and/or one or more remote servers 820 may be facilitated through various communication protocols. In some aspects, client devices 802, 804, 806, server 810 and/or one or more remote servers 820 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 808 can include, for example, any one or more of a personal area network (PAN), a local area network (LAN), a campus area network (CAN), a metropolitan area network (MAN), a wide area network (WAN), a broadband network (BBN), the Internet, and the like. Further, network 808 can include, but is not limited to, any one or more of the following network topologies, including a bus network, a star network, a ring network, a mesh network, a star-bus network, a tree or hierarchical network, and the like.

It should be noted that, a person skilled in the art should understand that the functions implemented by the modules shown in the embodiment of the identity verification system can be understood with reference to the related description of the aforementioned identity verification method. The functions of the modules shown in the embodiment of the identity verification system can be implemented by a program (executable instructions) running on a processor, and can also be implemented by a specific logic circuit. When implemented in the form of software function modules and sold or used as an independent product, the identity verification system of the embodiments of the present application can also be stored in a computer-readable storage medium. Based on such understanding, the technical solution provided by embodiments of the present application or the part that contributes to the prior art may be embodied in the form of a software product. The computer software product is stored in a storage medium, and includes several instructions used to cause a computer device (which may be a personal computer, a server, a network apparatus, or the like) to execute all or part of the method described in each embodiment of the present application. The aforementioned storage medium may be any medium capable of storing program code, such as a USB flash drive, a removable hard disk, a Read Only Memory (ROM), a magnetic disk, or an optical disc. In this way, the embodiments of the present application are not limited to any specific combination of hardware and software.

Correspondingly, an embodiment of the present application further provides a computer-readable storage medium, on which computer-executable instructions are stored. The computer-executable instructions are executed by a processor to implement each method embodiment of the present application. The computer-readable storage medium includes permanent and non-permanent, movable and non-movable media that can achieve information storage by means of any methods or techniques. The information may be computer-readable instructions, data structures, modules of programs or other data. Examples of a storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible by a computing device. According to the definitions herein, the computer-readable storage medium does not include transitory computer-readable media (transitory media), such as a modulated data signal and a carrier wave.

In addition, an embodiment of the present application further provides an identity verification system, including a memory for storing computer-executable instructions and a processor; the processor executes the computer-executable instructions in the memory to implement the steps in each method embodiment. The processor may be a Central Processing Unit (CPU), and may also be another general-purpose processor, a Digital Signal Processor (DSP), an Application Specific Integrated Circuit (ASIC), or the like. The memory may be a Read-Only Memory (ROM), a Random Access Memory (RAM), a flash drive, a hard disk, a solid-state drive, or the like. The steps of the methods disclosed in the embodiments of the present invention may be directly executed and completed by a hardware processor, or may be executed and completed by a combination of hardware and software modules in a processor.

It should be noted that in the application documents of the patent, relational terms such as first and second are used only to differentiate an entity or operation from another entity or operation, and do not require or imply that any actual relationship or sequence exists between these entities or operations. In addition, the term "include," "comprise," or any other variation thereof is intended to encompass a non-exclusive inclusion, so that a process, method, article, or device that includes a series of elements includes not only those elements but also other elements not explicitly listed, or elements that are inherent to such a process, method, article, or device. The element defined by the statement "including one" without further limitation, does not preclude the presence of additional identical elements in the process, method, article, or device that includes the element. In the application documents of the patent, performing a certain behavior according to a certain element refers to performing the behavior according to at least the element, which includes two cases: executing the behavior according to only the element and executing the behavior according to the element and other elements. The expressions of multiple, a plurality of, a variety of, and the like include two and two or more than two.

All of documents mentioned in the present application are considered to be integrally included in the disclosure of the present application, and can serve as a basis for modification when required. It should be understood that the above are merely preferred embodiments of the specification, and are not intended to limit the protection scope of the specification. Any modifications, equivalent substitutions, and improvements made within the spirit and the principle of one or a plurality of embodiments of the specification shall fall within the protection scope of the one or plurality of embodiments of the specification.

What is claimed is:

1. A computer-executed method, comprising:
receiving, by a digital identity client executing on a computer, an identity-verification request comprising an identifier of a user;
sending, by the digital identity client to an identity-verification-service-publishing blockchain network, a query for available identity-verification services;
determining an identity-verification server based on a result of the query;
verifying identity of the user based on the identity-verification server;
generating a public-private key pair comprising a public key and a private key corresponding to the identifier of the user;
storing, in an identity-verification blockchain network, identity-verification information corresponding to the user, wherein the identity-verification information is associated with the public-private key pair for the user, thereby facilitating subsequent identity verification of the user;
receiving, by the digital identity client from an application requiring identity verification of the user, a first request comprising the identifier of the user and first information; and
transmitting the public key corresponding to the identifier of the user and signed data to the application, wherein the signed data is generated by signing the first information using the corresponding private key, thereby facilitating the application in performing identity verification of the user, wherein the identity-verification blockchain network comprises nodes located in different countries or regions, and wherein a first node of the identity-verification blockchain network and the application belong to a same country or region.

2. The method according to claim 1, further comprising:
sending, by the application, a checking request to a first node of the identity-verification blockchain network, wherein the checking request comprises the signed data and the public key, thereby facilitating the first node to perform checking based on the signed data and the public key;
receiving, by the application, a checking result from the first node of the identity-verification blockchain network; and
performing identity verification of the user according to the checking result.

3. The method according to claim 2:
wherein the identity-verification information stored in the identity-verification blockchain network further comprises: a hash value of the public key, a type of identity verification that successfully validates the user's identity, and a hash value of the identifier of the user;
wherein the checking request further comprises a hash value of the identifier of the user; and
wherein the first node performs the checking by:
  computing a hash value of the public key included in the checking request;
  searching the identity-verification blockchain network for an identifier hash value and a type of identity verification that successfully validates the user's identity corresponding to the computed hash value of the public key;
  performing signature validation on the signed data in the checking request using the public key; and
  in response to the searched identifier hash value matching the identifier of the user in the checking request and the signature validation being successful, sending to the application the searched type of identity verification that successfully validates the user's identity as the checking result.

4. The method according to claim 3, further comprising:
in response to determining, by the application, that the type of identity verification that successfully validates the user's identity in the checking result does not meet a service requirement, querying a second node of the identity-verification-service-publishing blockchain network for an identity verification service meeting the service requirement;
sending a second identification-verification request, by the application to the digital identity client, which forwards the second identification-verification request to a server associated with the identity verification service meeting the service requirement, wherein the second identification-verification request comprises the signed data and the public key; and
performing, by the server associated with the identity verification service meeting the service requirement, identity validation of the user and updating the identity-verification information stored in the identity-verification blockchain network.

5. The method according to claim 4, wherein the identity-verification-service-publishing blockchain network comprises nodes located in different countries or regions, and wherein the second node of the identity-verification-service-publishing blockchain network and an object requiring identity verification belong to the same country or region.

6. The method according to claim 3, wherein updating the identity-verification information stored in the identity-verification blockchain network further comprises:
sending, by the server associated with the identity verification service meeting the service requirement, to a third node of the identity-verification blockchain network the signed data and the public key;
performing, by the third node, signature checking on the signed data based on the public key; and
in response to the signature checking being successful, updating the identity-verification information corresponding to the public key.

7. The method according to claim 1, wherein the first information comprises one or more of: a service identifier and a random number.

8. The method according to claim 1, wherein the determined identity-verification server is located in a domiciled country or region associated with the user.

9. The method according to claim 1, further comprising:
sending, by an identity-verification server, to a fourth node of the identity-verification-service-publishing blockchain network information associated with the available identity-verification services, wherein the fourth node and the identity-verification server belong to the same country or region; and
storing, by the fourth node, the information associated with the available identity-verification services in the identity-verification-service-publishing blockchain network, and publishing the information to other nodes of the identity-verification-service-publishing blockchain network.

10. A computer system, comprising:
a processor;
a storage device coupled to the processor and storing instructions, which when executed by the processor cause the processor to perform a method, the method comprising:
receiving, by a digital identity client, an identity-verification request comprising an identifier of a user;
sending, by the digital identity client to an identity-verification-service-publishing blockchain network, a query for available identity-verification services;
determining an identity-verification server based on a result of the query;
verifying identity of the user based on the identity-verification server;
generating a public-private key pair comprising a public key and a private key corresponding to the identifier of the user;
storing, in an identity-verification blockchain network, identity-verification information corresponding to the user, wherein the identity-verification information is associated with the public-private key pair, thereby facilitating subsequent identity verification of the user;
receiving, by the digital identity client from an application requiring identity verification of the user, a first request comprising the identifier of the user and first information; and
transmitting the public key corresponding to the identifier of the user and signed data to the application, wherein the signed data is generated by signing the first information using the corresponding private key, thereby facilitating the application in performing identity verification of the user,
wherein the identity-verification blockchain network comprises nodes located in different countries or regions, and wherein a first node of the identity-verification blockchain network and the application belong to a same country or region.

11. The computer system according to claim 10, wherein the method further comprises:
sending, by the application, a checking request to a first node of the identity-verification blockchain network, wherein the checking request comprises the signed data and the public key, thereby facilitating the first node to perform checking based on the signed data and the public key;
receiving, by the application, a checking result from the first node of the identity-verification blockchain network; and
performing identity verification of the user according to the checking result.

12. The computer system according to claim 11:
wherein the identity-verification information stored in the identity-verification blockchain network further comprises: a hash value of the public key, a type of identity verification that successfully validates the user's identity, and a hash value of the identifier of the user;
wherein the checking request further comprises a hash value of the identifier of the user; and
wherein the first node performs the checking by:
computing a hash value of the public key included in the checking request;
searching the identity-verification blockchain network for an identifier hash value and a type of identity verification that successfully validates the user's identity corresponding to the computed hash value of the public key;
performing signature validation on the signed data in the checking request using the public key; and
in response to the searched identifier hash value matching the identifier of the user in the checking request and the signature validation being successful, sending to the application the searched type of identity verification that successfully validates the user's identity as the checking result.

13. The computer system according to claim 12, wherein the method further comprises:
in response to determining, by the application, that the type of identity verification that successfully validates the user's identity in the checking result does not meet a service requirement, querying a second node of the identity-verification-service-publishing blockchain network for an identity verification service meeting the service requirement;
sending a second identification-verification request, by the application to the digital identity client, which forwards the second identification-verification request to a server associated with the identity verification service meeting the service requirement, wherein the second identification-verification request comprises the signed data and the public key; and
performing, by the server associated with the identity verification service meeting the service requirement, identity validation of the user and updating the identity-verification information stored in the identity-verification blockchain network.

14. The computer system according to claim 13, wherein the identity-verification-service-publishing blockchain network comprises nodes located in different countries or regions, and wherein the second node of the identity-verification-service-publishing blockchain network and an object requiring identity verification belong to the same country or region.

15. The computer system according to claim 12, wherein updating the identity-verification information stored in the identity-verification blockchain network further comprises:
sending, by the server associated with the identity verification service meeting the service requirement, to a third node of the identity-verification blockchain network the signed data and the public key;
performing, by the third node, signature checking on the signed data based on the public key; and
in response to the signature checking being successful, updating the identity-verification information corresponding to the public key.

16. The computer system according to claim 10, wherein the first information comprises one or more of: a service identifier and a random number.

17. The computer system according to claim 10, wherein the determined identity-verification server is located in a domiciled country or region associated with the user.

18. The computer system according to claim 10, wherein the method further comprises:
sending, by an identity-verification server, to a fourth node of the identity-verification-service-publishing blockchain network information associated with the available identity-verification services, wherein the fourth node and the identity-verification server belong to the same country or region; and
storing, by the fourth node, the information about the available identity-verification services in the identity-verification-service-publishing blockchain network, and publishing the information to other nodes of the identity-verification-service-publishing blockchain network.

* * * * *